United States Patent
Wu

(10) Patent No.: US 8,998,048 B1
(45) Date of Patent: Apr. 7, 2015

(54) ELECTRONIC DEVICE HOLDER ON BICYCLE

(71) Applicant: Pao-Kung Wu, Changhua (TW)

(72) Inventor: Pao-Kung Wu, Changhua (TW)

( * ) Notice: Subject to any disclaimer, the term of this patent is extended or adjusted under 35 U.S.C. 154(b) by 0 days.

(21) Appl. No.: 14/474,247

(22) Filed: Sep. 1, 2014

(51) Int. Cl.
*B62J 11/00* (2006.01)

(52) U.S. Cl.
CPC .............. *B62J 11/00* (2013.01); *Y10S 224/929* (2013.01)

(58) Field of Classification Search
USPC ......... 224/420, 441, 443, 445, 450, 452, 456, 224/461, 929
See application file for complete search history.

(56) References Cited

U.S. PATENT DOCUMENTS

| | | | | |
|---|---|---|---|---|
| 4,981,243 | A * | 1/1991 | Rogowski | 224/431 |
| 6,305,241 | B1 * | 10/2001 | Masui et al. | 74/551.8 |
| 6,378,815 | B1 * | 4/2002 | Lee | 248/121 |
| 6,647,248 | B1 * | 11/2003 | Ortscheid et al. | 455/575.1 |
| 6,711,966 | B2 * | 3/2004 | Chuang | 74/551.8 |
| 7,922,136 | B2 * | 4/2011 | Lien et al. | 248/222.11 |
| 8,261,954 | B2 * | 9/2012 | Lee | 224/282 |
| 8,267,418 | B1 * | 9/2012 | Chuang | 280/279 |
| 8,490,937 | B2 * | 7/2013 | Crain et al. | 248/316.6 |
| 8,602,277 | B2 * | 12/2013 | Lee | 224/282 |
| 8,613,379 | B2 * | 12/2013 | Lee | 224/282 |
| 8,627,990 | B2 * | 1/2014 | Nakajima et al. | 224/420 |
| 8,651,350 | B2 * | 2/2014 | Onogi | 224/421 |
| 8,727,192 | B2 * | 5/2014 | Lai | 224/420 |
| 2004/0108348 | A1 * | 6/2004 | Barnes | 224/413 |
| 2007/0045495 | A1 * | 3/2007 | Asano et al. | 248/309.1 |
| 2007/0068985 | A1 * | 3/2007 | Nakahara | 224/420 |
| 2007/0284497 | A1 * | 12/2007 | Naccarato et al. | 248/309.1 |
| 2007/0296179 | A1 * | 12/2007 | Orr et al. | 280/288.4 |
| 2010/0127030 | A1 * | 5/2010 | Muhlberger | 224/420 |
| 2014/0061270 | A1 * | 3/2014 | Richter | 224/420 |
| 2014/0157944 | A1 * | 6/2014 | Galstad | 74/551.8 |
| 2014/0182815 | A1 * | 7/2014 | Shih et al. | 165/80.3 |

* cited by examiner

*Primary Examiner* — Justin Larson
(74) *Attorney, Agent, or Firm* — Che-Yang Chen; Law Office of Michael Chen

(57) ABSTRACT

An electronic device holder on a bicycle may include a frame body and a standpipe connection seat, and the frame body is composed of a body, a clamping device, two rotation controls and the nip unit pressing as the combination. The standpipe connection seat is provided with a fine adjustment unit, and the fine adjustment unit, is located on the beam of the glove with the set of risers, and provided to assemble for the anchor of body.

7 Claims, 15 Drawing Sheets

ELECTRONIC DEVICE HOLDER ON BICYCLE

FIELD OF THE INVENTION

The present invention relates to a structure improvement on bicycle clamp holder with electronic gadgets, especially with an adjustable clamping distance, and the clamp holder will be suitable for a variety of models to hold its electronic gadgets for bicycle riders, as structure reformers.

BACKGROUND OF THE INVENTION

Conventionally, the purpose of bicycle riding experience is not only to be limited as to travel, and fitness, but, when moving forward is simply relied on human stampede, it will be no need for any additional emissions or caused fuel problems. Because there are so many benefits counting down just for riding a bicycle, the governments worldwide and the trend of sports biking in recent years rushing towards the world, are pleased to see its blooming industry, hoping to reduce the usage of automobile and motorcycle with bicycles. On the other hand, due to a variety of electronic devices blooming popularly (such as smart phones, tablet PCs, PDA or mobile navigation system), many riders are able to install an electronic device onto its handlebar or standpipe to deliver a viewable system, which not only to provide an effective route traffic information, weather changes, but also to be used to monitor the data movement, any time with operation.

However, the conventional structure described above is to the practical applications, which still have problems as followed: (a) it is not practical due to the variety types of bicycle in the market, the standpipe appearance and size of many, causing the electronic equipment unable to fully placed it onto the frame body, whereas the riders has to purchase an extra connection fitting to further utilize onto all kinds of risers and assembly. Moreover, when the frame to replace the vertical tube is attached to the frame body or wishing to ride on the other bicycle, the user have to purchase another piece to be assembled with the usage, increasing the use and purchase cost structure is not cost-effective, therefore reducing the willingness to purchase the holders for electronic equipment; (b) This is not practical because the current conventional frame body can be clamped; its length both fixed and cannot be adjusted. When the rider's electronic device to be replaced with a new and different size, the current frame body can no longer continue to provide the use of, and the need to purchase a new body, together with its stand, is undoubtedly a waste. Moreover, the conventional clamping frame body cannot effectively stop backing from its current position, which may be caused by the shock and shack, while riding and the electronic device may gradually loosen and fall.

Therefore, there remains a need for a new and improved structure for the bicycle clamp holder to overcome the problems stated above.

SUMMARY OF THE INVENTION

To solve the problem stated above, the present invention provides a structural improvement on bicycle clamping device for electronic gadgets, comprising: a frame body and a standpipe connection seat, and the frame body is composed of a body, a clamping device, two rotation controls and the nip unit pressing as the combination. The standpipe connection seat is provided with a fine adjustment unit, and the fine adjustment unit, is located on the beam of the glove with the set of risers, and provided to assemble for the anchor of body. There are two support arms stretched out before the top edge of the convex neck. The convex neck has long hole down through the long end of the internal bore provided for positioning with the valve spring hook column. There is a side to run through a channel behind the level of the body. The channel down each end connected to a through hole has a capacity room, then to the bottom of the outer container chamber through an opening in the body, and the body behind the line through the air, with the use of a tool to serve cross-shaped slot backplane. The moveable blocks have placed through two side ends into the channel from clamping device. The moveable blocks in between are fixed with spring. When the two movable blocks outwardly separated away from each other, through pulling back the spring, so that the two movable blocks can each reset from the active access, after the external force is removed. From limiting the movable blocks to expanded ledge from outer end of the, avoid the movable block pulls away from the other side pushing from the other movable block. Behind the movable block there is a recess, and each has a protruding upward oblique guide surface against the frame sheet. There is a track slot at the side, and the track slot equipped with elastic teeth. The track slot is to provide the rack wearing through with two jaws, so that the jaws are able to be utilized with elastic teeth and its rack after obtaining positioned to mobilize and latch. On the outer end of each rack extending forward with a gripping piece.

A rotary control has a push button with appropriate bending angle, and a wave chip. The rotary control is pivoted of the container chamber in the middle portion of the body, so that paddles can pass through hole towards to the concave portion of the movable block. A push button extends out from the opening, and when the rotary control is pivotally placed in the container chamber holder, then through the combination of backplane and the body to control rotation stopper and the holding unit from falling out. The nip unit contains inner and outer gripping arms and a rail. The rail and the gripping arms arranged along the elongate hole through the long hole inside the body. By utilizing a downward gap from rear rail to provide escape spaces for the frame sheets successfully through the rail with two moveable blocks, and with its inclined surface and the rail through the outer sides of the bottom edge generated by the arrival. The rail of the notch extended at the bottom with a spring, the other end of the hook button positioning column, above the gap is elastic tooth and clamp arm disposed rearward of the card-shaped junction in a continuous teeth forming a nip unit, and the gripping arm extending forward above the clamping pieces.

The fine adjustment unit has two pieces of latches. The two latches are fastened to the opposite direction separately perforated with connection holes and combination holes. The other two pieces of latches, which have fastening holes at the outer edge of the end of opposite side, setup a ring gear. The two latches are also setup corresponding with connection holes and connection holder. Through the connection holder, setup an anchor for the assembly of the body. A two locking knot holes are connect through the connection holder corresponding to connection holes with two pieces of latches, and the junction knot unit is formed on top of as a curved surface. Through the curved surface, there is a screw hole, and its two latches are provided with combination holes and also a fit washer; whereby the system can constitute an electronic gadget holder as the structure reformers.

Comparing with prior arts, the present invention is advantageous because (i) the present invention is the structural improvement on bicycle clamping device for electronic gadgets, its fine adjustment unit provide the body to stabilize device, coupled with a fixed risers installed on the holder.

When desire to use on other types of bicycles, or when user want to replace the standpipe bicycle frame structure, are assembled for longer usage to adjust the size of fine adjustment unit corresponds to the structure of the standpipe. Therefore, the holder with fine adjustment unit is applicable to various types of risers, adding to the convenience of the use of holder without an additional correspondence or to other types of bicycle purchase for its additional standpipe fittings, effectively reducing the cost structure, and is cost-effective; (ii) the structural improvement on bicycle clamping device for electronic gadgets, wherein the distance which the movable clamp, so that the frame body is not limited to the use of the electronic gadget of a single size, so when the consumer electronic gadget replacement when a different size, the frame body will still be able to use, serve to avoid frequent replacement of the frame body and become wasters; (iii) the structural improvement on bicycle clamping device for electronic gadgets, which carried out the elastic retaining teeth on the rack, with the spring pull back force, to can get double the positioning force, so that the clamping device not worry to be easily released with shock. It can prevent the electronic gadget from falling while riding to achieve safe use; and (iv) the structural improvement on bicycle clamping device for electronic gadgets, which the moveable blocks, its activities to tighten or loosen the jaws, so the electronic gadget mounted on the respective place, its mount and discharge without separate operation, to reach the greatest convenience to those who use it.

DETAILED DESCRIPTION OF THE INVENTION

Figure 1:
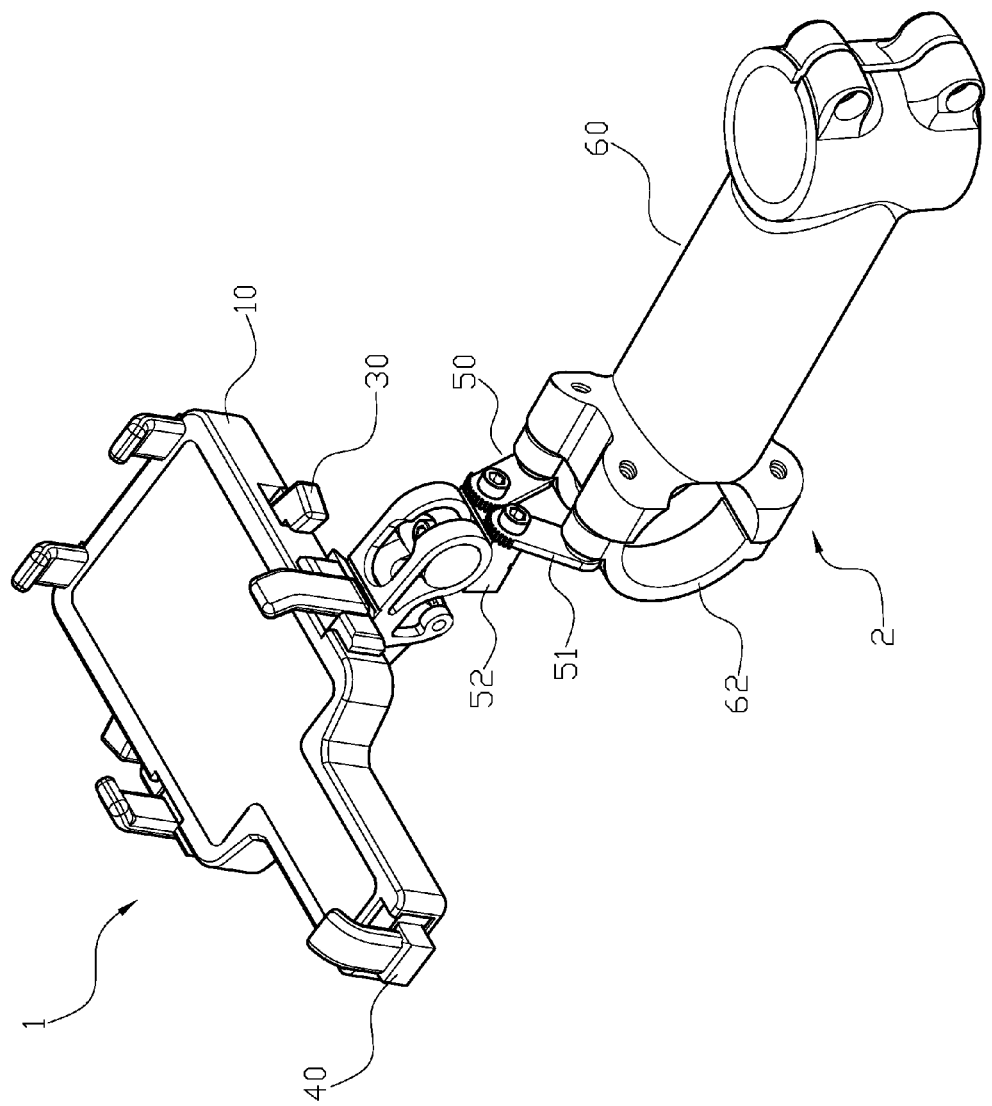
FIG. 1 illustrates a three-dimensional view in the present invention.
Figure 2:
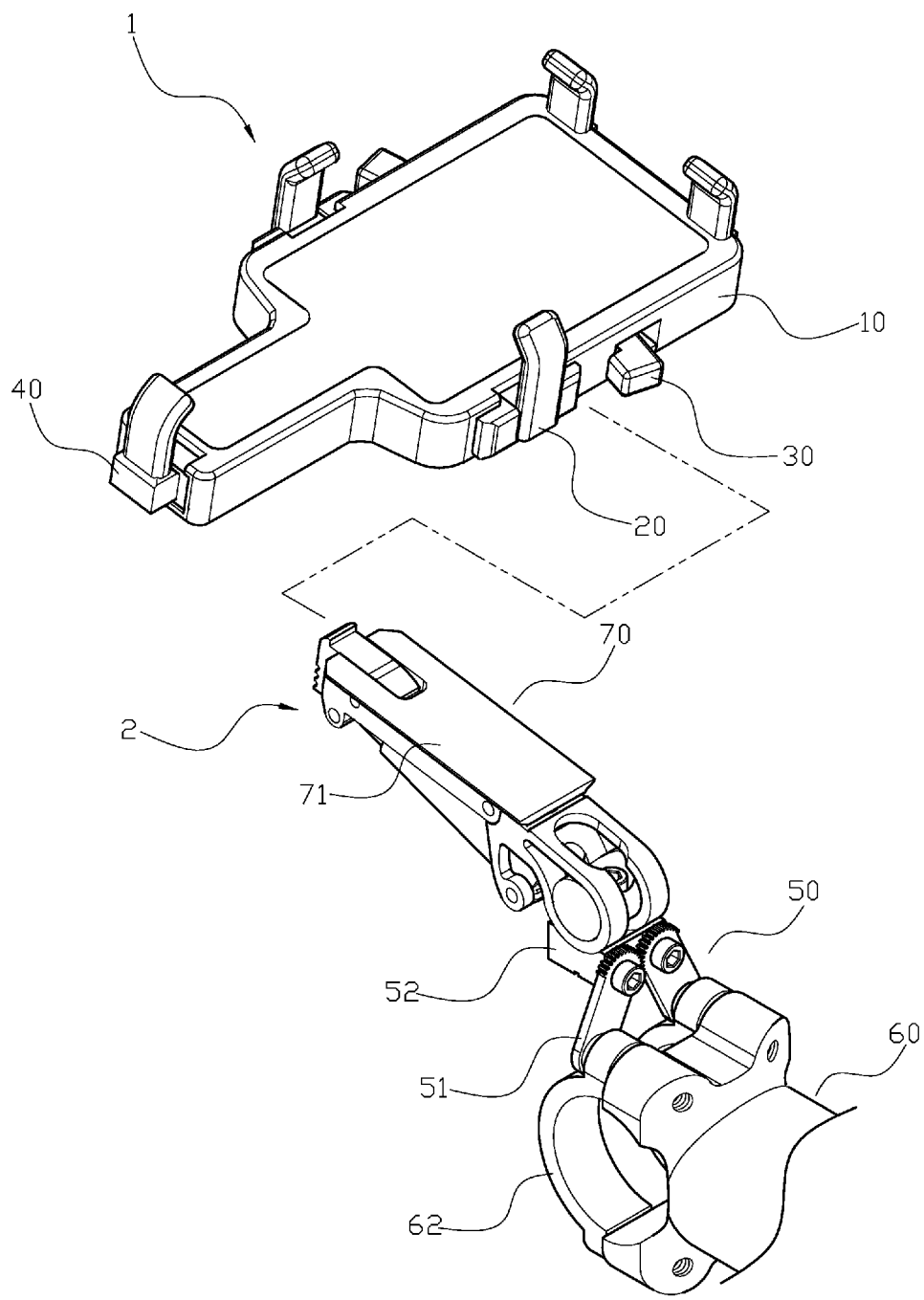
FIG. 2. illustrates a perspective exploded view of the system in the present invention
Figure 3:
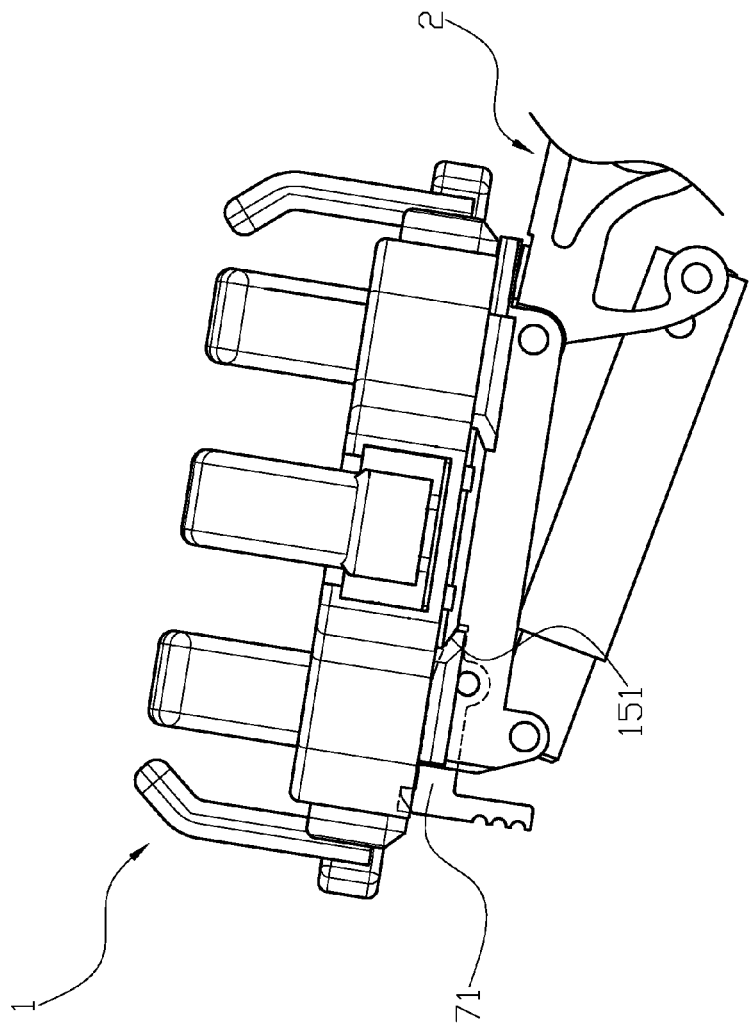
FIG. 3 illustrates a two-dimensional view in the present invention.
Figure 4:
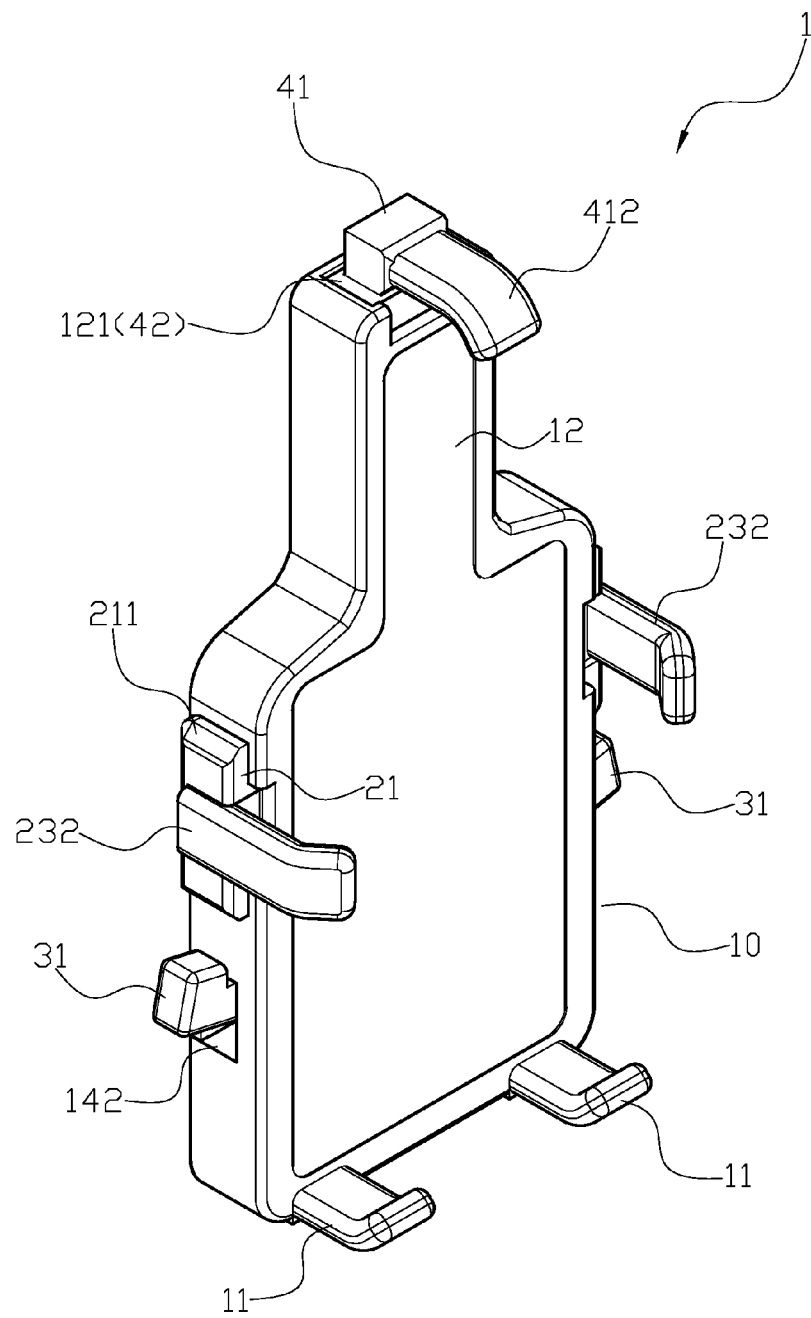
FIG. 4 is a perspective view of the frame body in the present invention.
Figure 5:
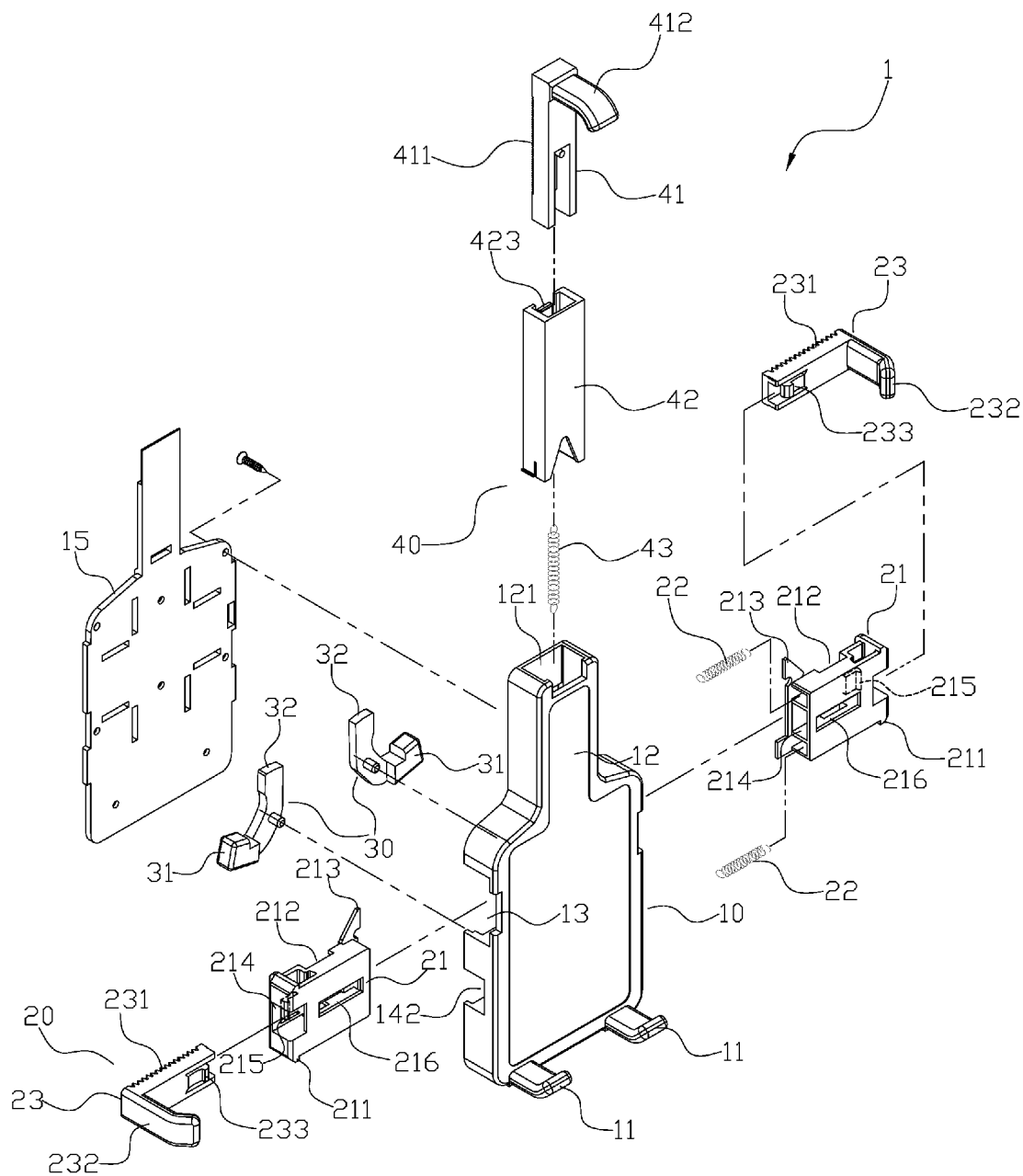
FIG. 5 is an exploded view of the frame body in the present invention.
Figure 6:
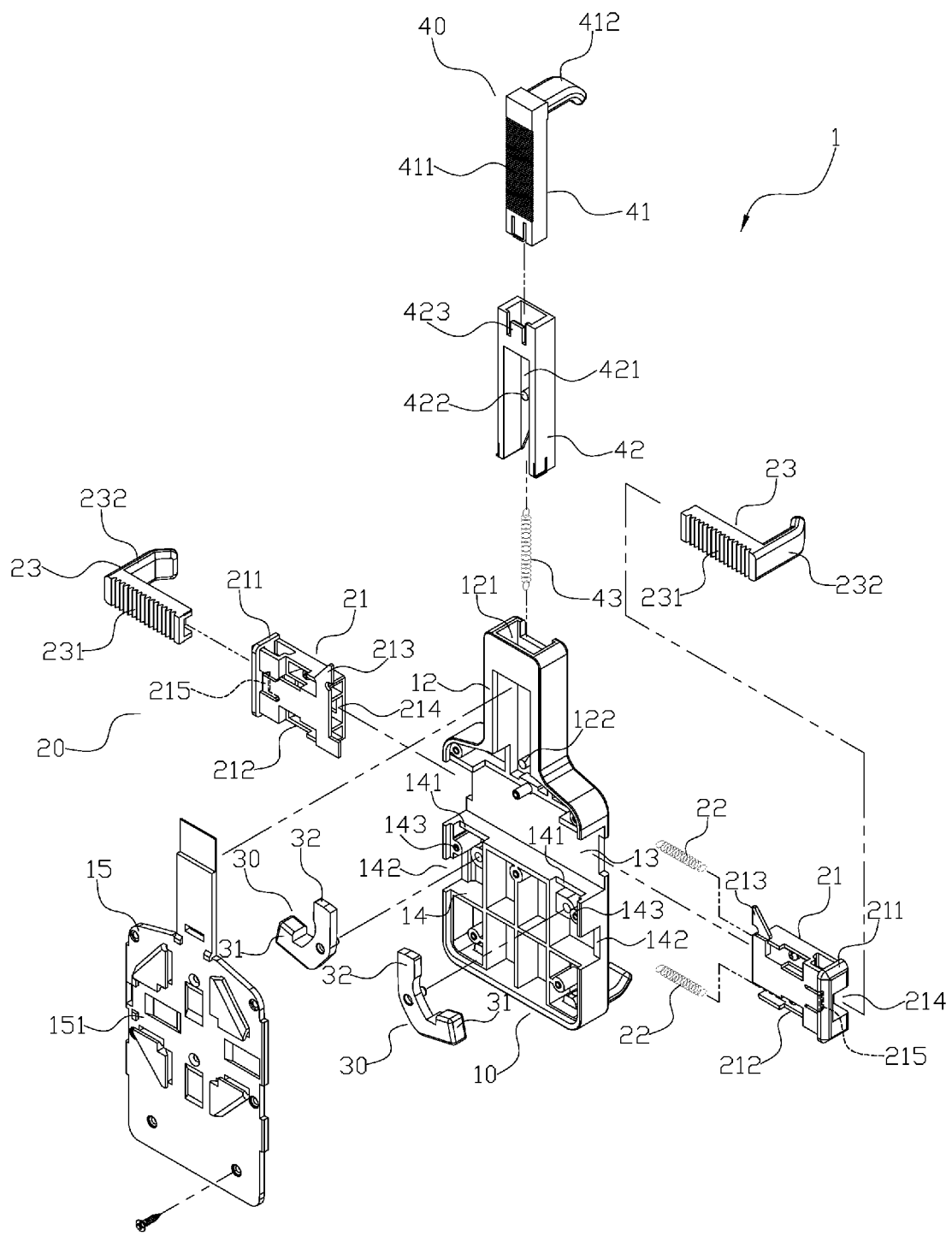
FIG. 6 is an exploded view from another angle of the frame body in the present invention.
Figure 7:
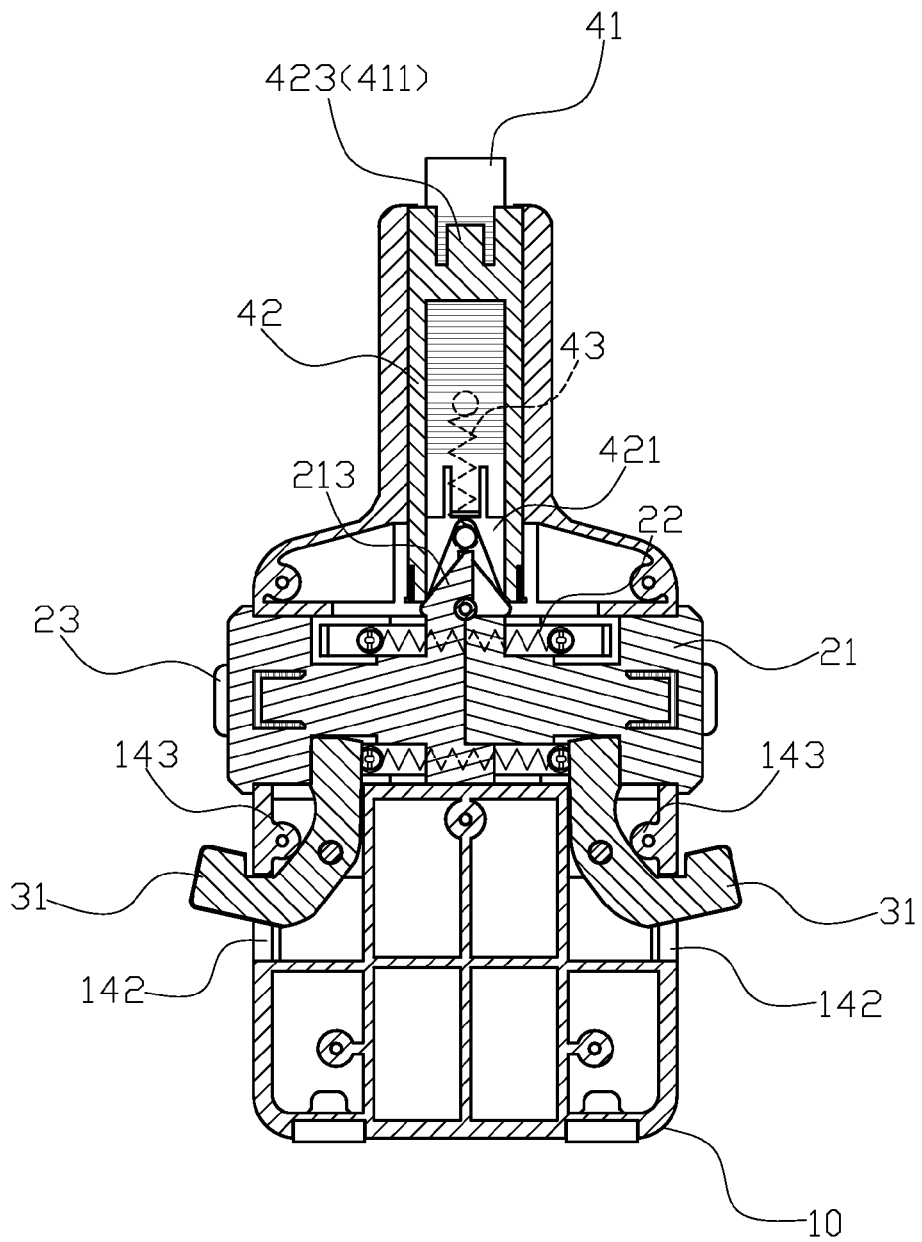
FIG. 7 is a sectional view of the frame body in the present invention.
Figure 8:
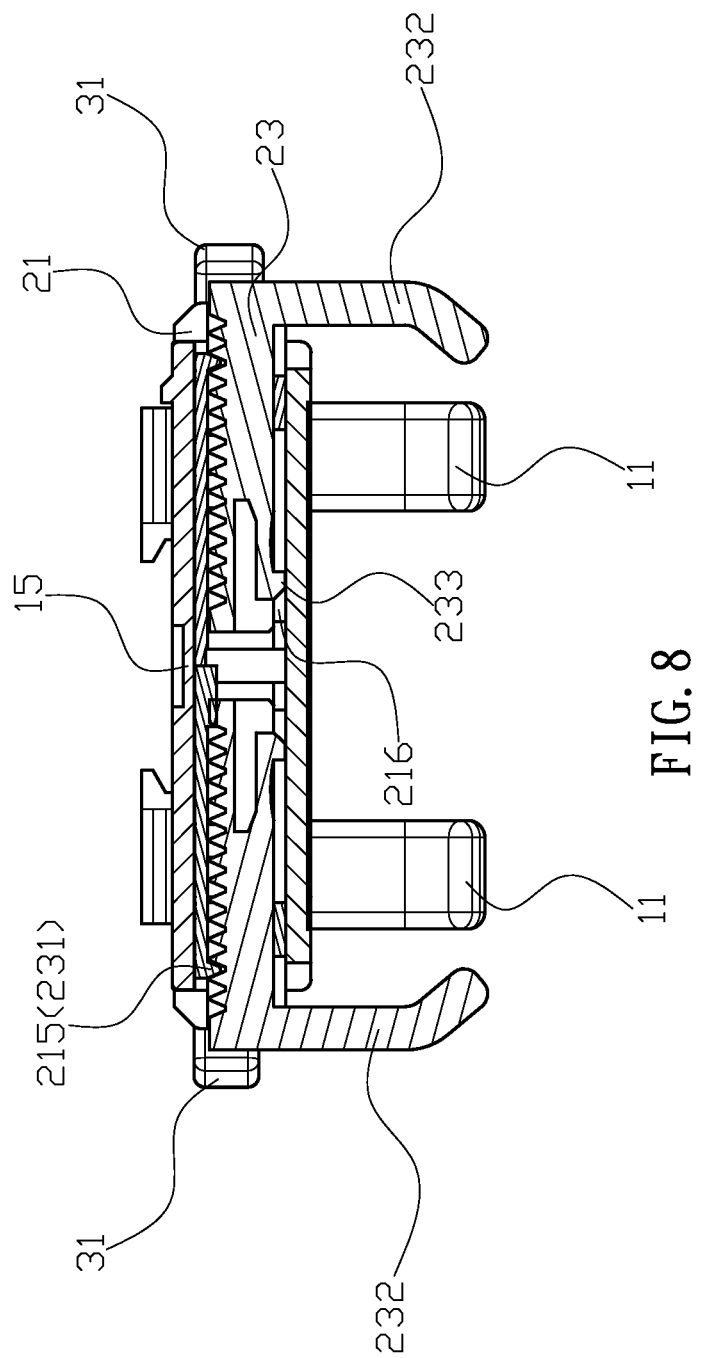
FIG. 8 is a sectional view of the frame body from another angle.
Figure 9:
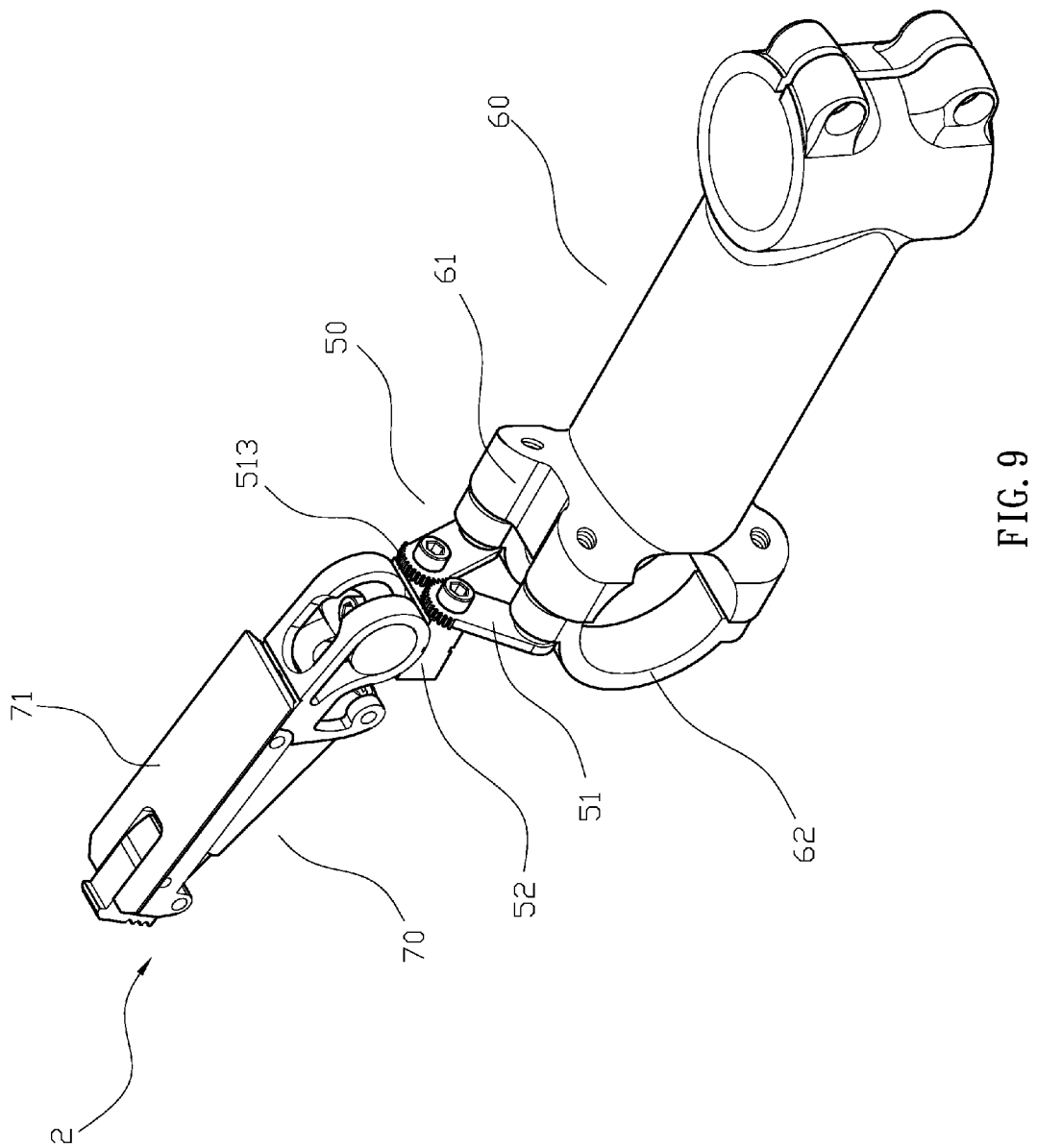
FIG. 9 is a perspective view of the standpipe connection seat in the present invention.
Figure 10:
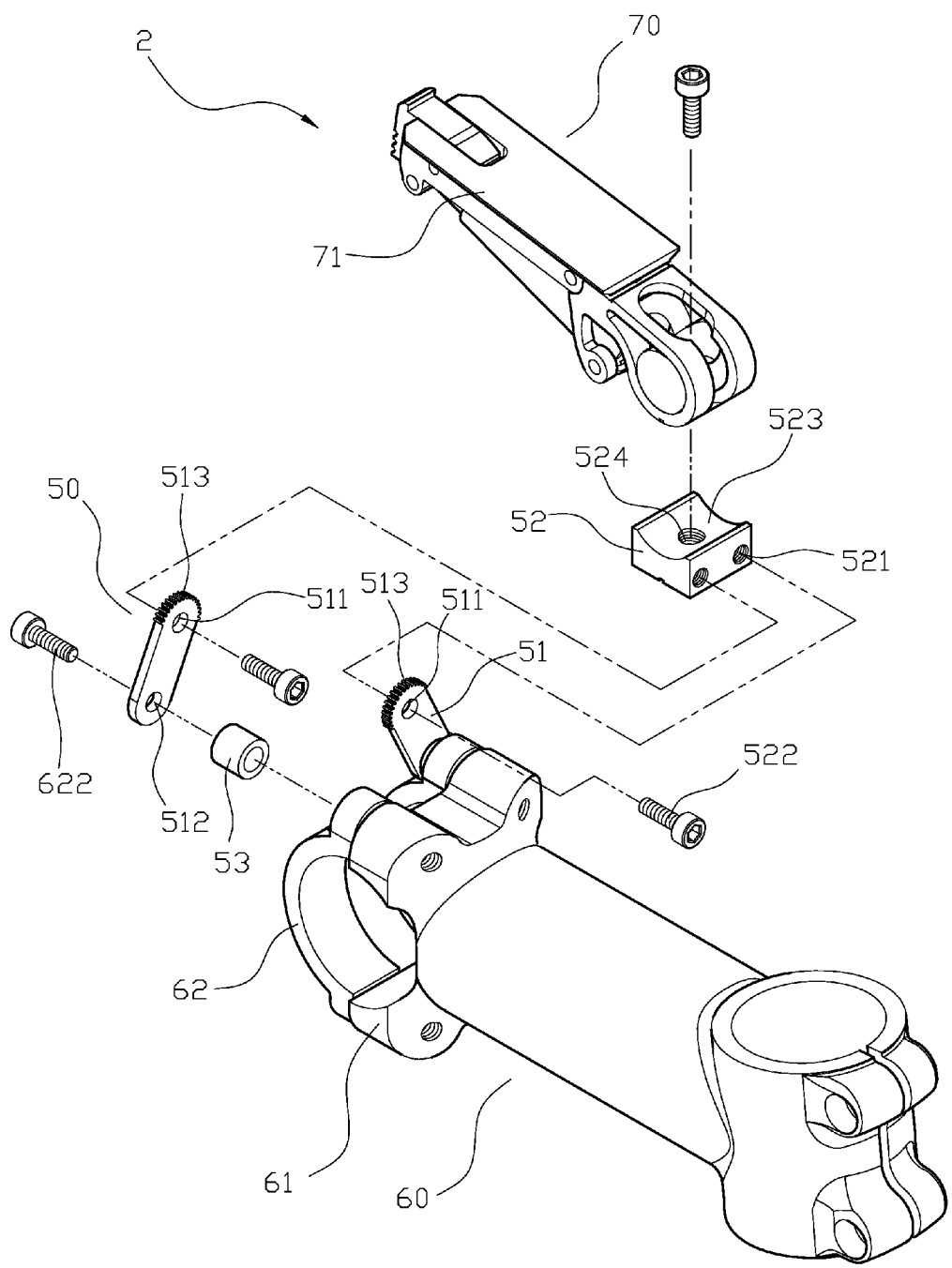
FIG. 10 is an exploded view of the standpipe connection seat in the present invention.
Figure 11:
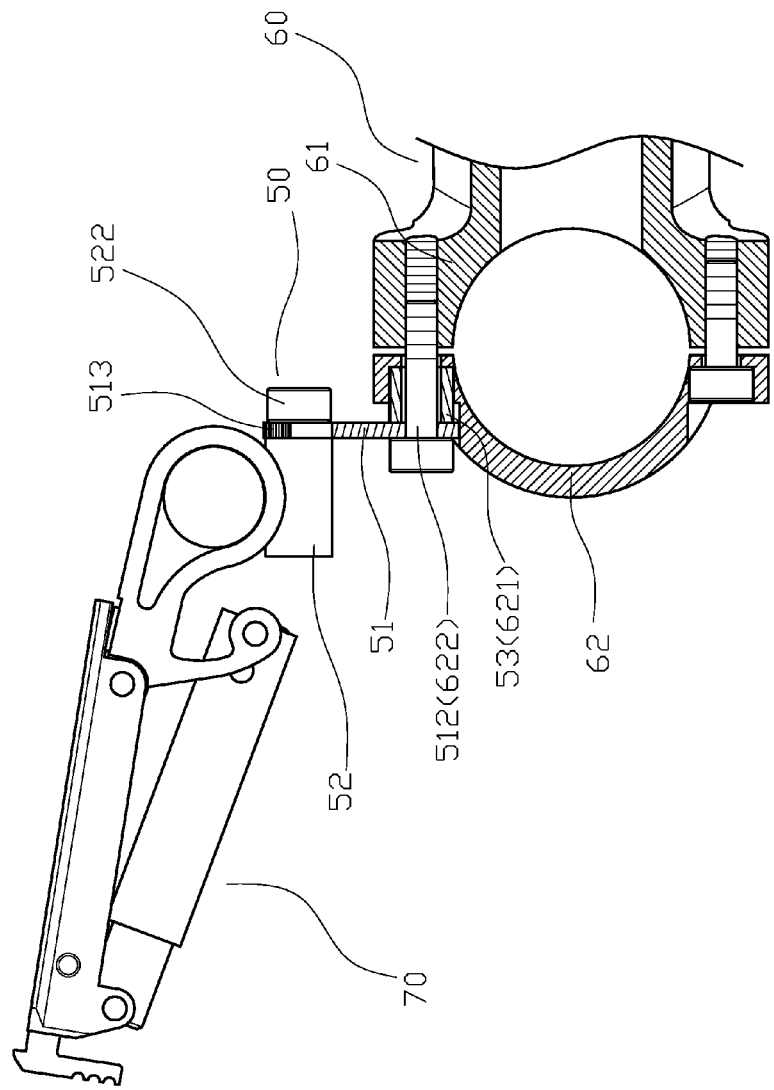
FIG. 11 is a sectional view of the standpipe connection seat in the present invention.
Figure 12:
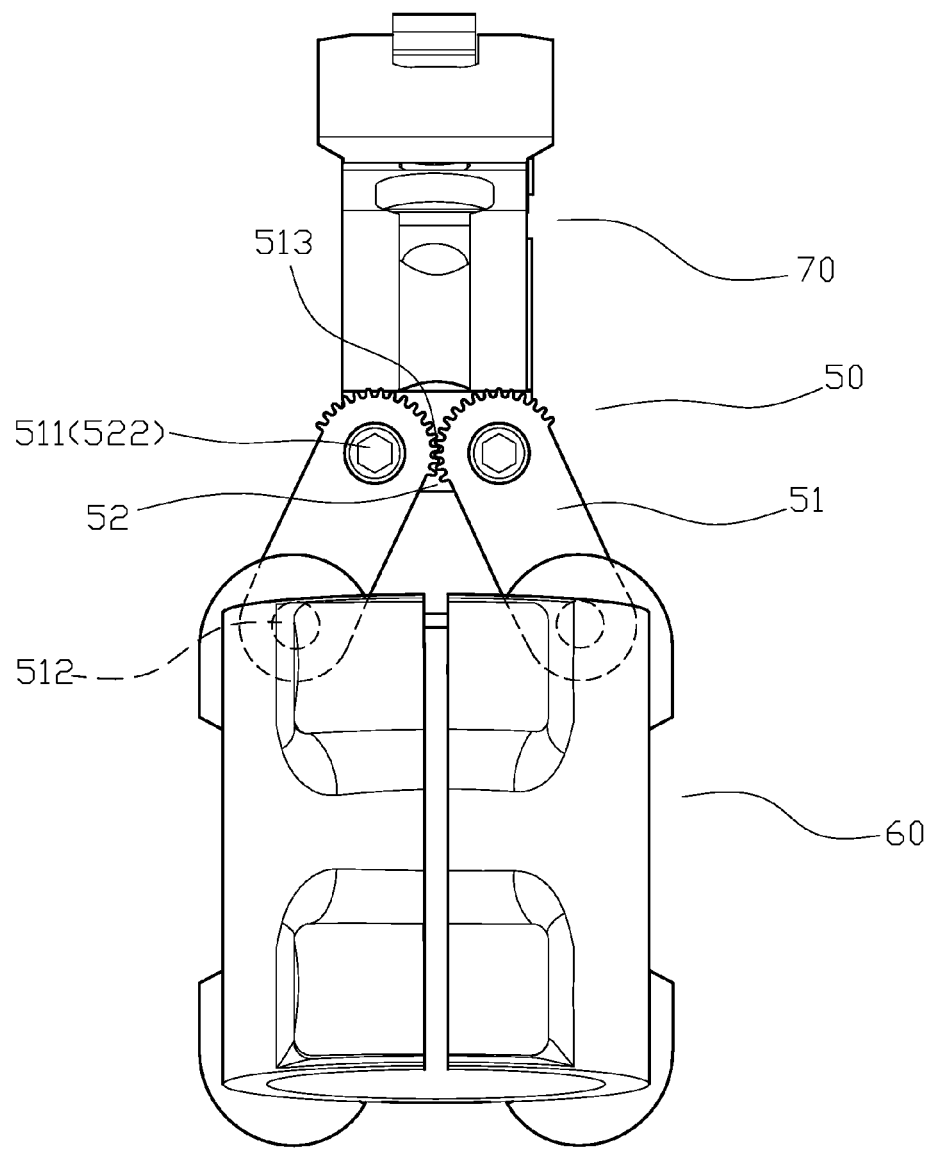
FIG. 12 is a two-dimensional view of the standpipe connection seat in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIG. 1 to FIG. 12, an electronic device holder on a bicycle comprises: a frame body (1) and a standpipe connection seat (2). The frame body (1) is composed of a body (10), a clamping device (20), two rotation controls (30) and a nip unit (40) pressing as the combination. The standpipe connection seat (2) is provided with a fine adjustment unit (50), and the fine adjustment unit (50) is located on the beam of the glove (61) with the set of standpipe (60), and provided to assemble for the holder (70) of body (10). Wherein the body (10) at the end projecting forward edge of the support has two arms (11), the top edge of the reduced diameter neck is provided with a convex neck (12), the convex neck (12) is provided a long hole (121) toward downwards, inside the end of the long hole (121), there is a latch hook (122) setup for spring (43) to position in its column. The body (10) has a rear opening on both sides of the horizontally to the penetrating channel (13), outer side of the channel (13) down through the hole (141) connected is a container chamber (14). The container chamber (14) below the outer side has an opening (142) through the body (10), and the body (10) open all the way through the back to serve a backplane (15) with cross-shaped slot (151). The clamping device (20) has two movable blocks (21) inserted from the side of channel (13), the springs (22) in between the two movable blocks (21) are fixed. When the two movable blocks (21) outwardly separated away from each other, through pulling back the spring (22) so that the two movable blocks (21) can each reset from the active access, after the external force is removed. From limiting the movable blocks (21) to expanded ledge (211) from outer end of the, avoid the movable block (21) pulls away from the other side pushing from the other movable block (21). Behind the movable block (21) there is a recess (212), and each has a protruding upward oblique guide surface against the frame sheet (213). There is a track slot (214) at the side, and the track slot (214) equipped with elastic teeth (215). The track slot (214) is to provide the rack (231) wearing through with two jaws (23), so that the jaws (23) are able to be utilized with elastic teeth (215) and its rack (231) after obtaining positioned to mobilize and latch.

On the outer end of each rack (231) extending forward with a gripping piece (232), a rotary control (30) has a push button

(31) with appropriate bending angle, and a wave chip (32). The rotary control (30) is pivoted of the container chamber (14) in the middle portion of the body (10), so that paddles (32) can pass through hole (141) towards to the concave portion (212) of the movable block (21).

A push button (31) extends out from the opening (142), and when the rotary control (30) is pivotally placed in the container chamber (14), then through the combination of backplane (15) and the body (10) to control rotation stopper (30) and the holding unit (20) from falling out. The nip unit (40) contains inner and outer gripping arms (41) and a rail (42). The rail (42) and the gripping arms (41) arranged along the elongate hole through the long hole (121) inside the body (10). By utilizing a notch (421) from rear rail (42) to provide escape spaces for the frame sheets (213) successfully through the rail (42) with two moveable blocks (21), and with its inclined surface and the rail (42) through the outer sides of the bottom edge generated by the arrival. The rail (42) of the notch (421) extended at the bottom with a spring (43), the other end of the hook button positioning column (422), above the notch (421) is elastic tooth (423) and clamp arm (41) disposed rearward of the card-shaped junction in a continuous teeth (411) forming a nip unit, the gripping arm (41) extending forward above the clamping pieces (412). The fine adjustment unit (50) has two pieces of latches (51). The two latches (51) are fastened to the opposite direction separately perforated with connection holes (511) and combination holes (512). The other two pieces of latches (51), which have connection holes (511) at the outer edge of the end of opposite side, setup a ring gear (513). The two latches (51) are also setup corresponding with connection holes (511) and connection holder (52). Through the connection holder (52), setup a holder (70) for the assembly of the body (10). Two lock knot holes (521) are connect through the connection holder (52) corresponding to connection holes (511) with two pieces of latches (51), and the lock knot unit (522) is formed on top of as a curved surface (523). Through the curved surface (523), there is a screw hole (524), and its two latches (51) are provided with combination holes (512) and also a fit washer (53).

A combination structure, the connection holes (511) of the two pieces of latches (51) is connected to the connection holder (52) of the lock knot holes (521) positioned form its opposite side. The two latches (51) are outwardly expanded and fitting ring gear (513) phase by the bite, and then provide the lock knot unit (522), whereby connecting hole (511), locks into connection holder (52) of the lock knot holes (521), limits the sheet body and the two latches (51) can be fitted into the ring gear (513) and linked to each other to limit occlusion. The fine adjustment unit (50) provided in the system has set on top of the standpipe (60), and wherein the standpipe (60) assembly in use, the beam of the glove bundle (61) corresponding to a front cover member (62). There are screw perforations (621) in the four corners of each end, and each provide the screw member (622) through the front cover member (62) and the beam of the glove bundle (61) fastening locked, whereby the fine adjustment unit (50) and the standpipe (60) when assembled. The first sheet of the two latches (51) by the combination holes (512) is to expand or condensed. The fitting ring gear (513) interlocking teeth together, so that the two pieces of latches (51) expand the same outward angles. Furthermore, while the combination holes (512) between two latches (51) relatively extending parallel to each other, to the front cover member (62) is screwed into the perforation holes (621). The two piece of latches (51) and the screw perforation (621) is provided between the insert sleeve, which can be further combined with the fit washer (53).

Finally, the screw member (622) was engaged with the fit washer (53) through the combination holes (512) of end of two latches (51). The two pieces of latches (51) and the front cover (62) formed a triangle and the beam of the glove bundle (61) locking the packing. So that the two latches (51) of the front cover member (62) is formed between the triangular point of a fixed state, whereby the fine adjustment unit (50) with a solid provided in the standpipe (60), and then using the connection holder (52) with the fixed holder (70) assembled in combination, for the purpose of frame body (1) usage.

Figure 13:
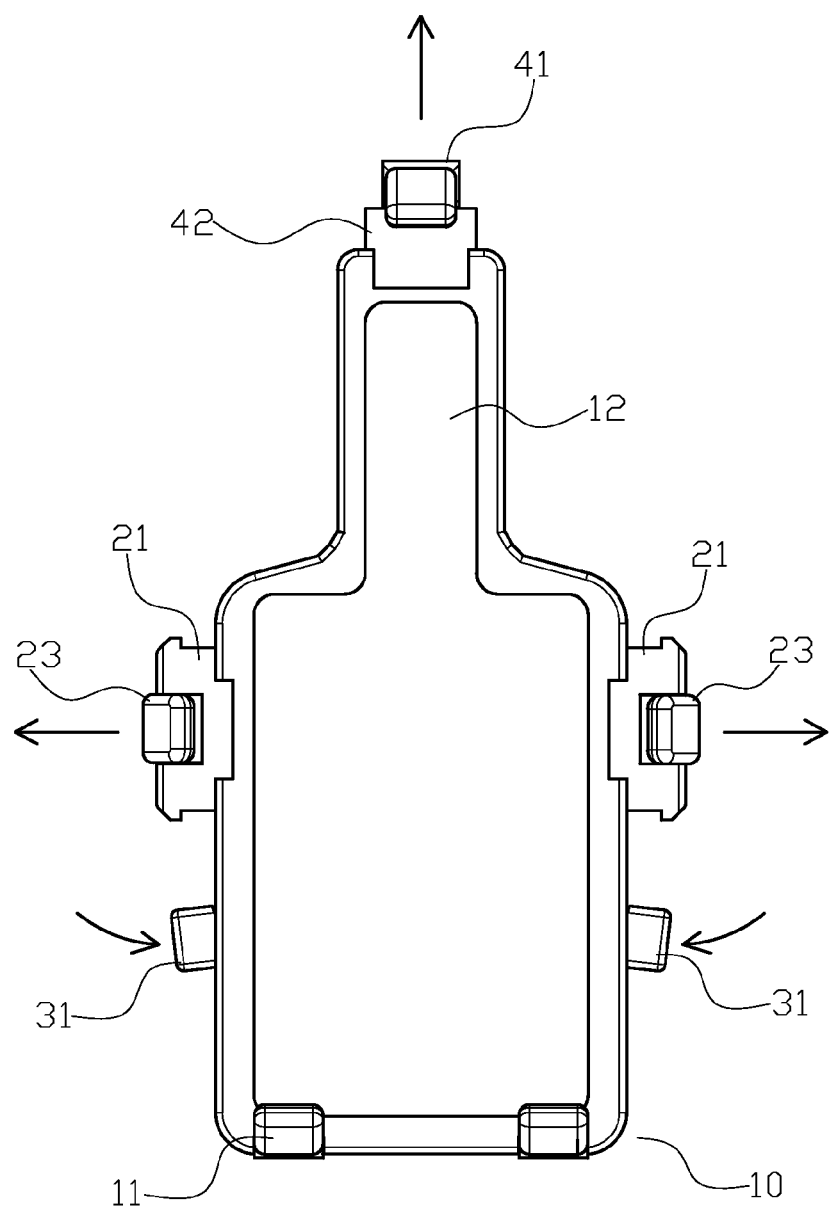
FIG. 13 illustrates two push buttons pressed simultaneously in the present invention.
Figure 14:
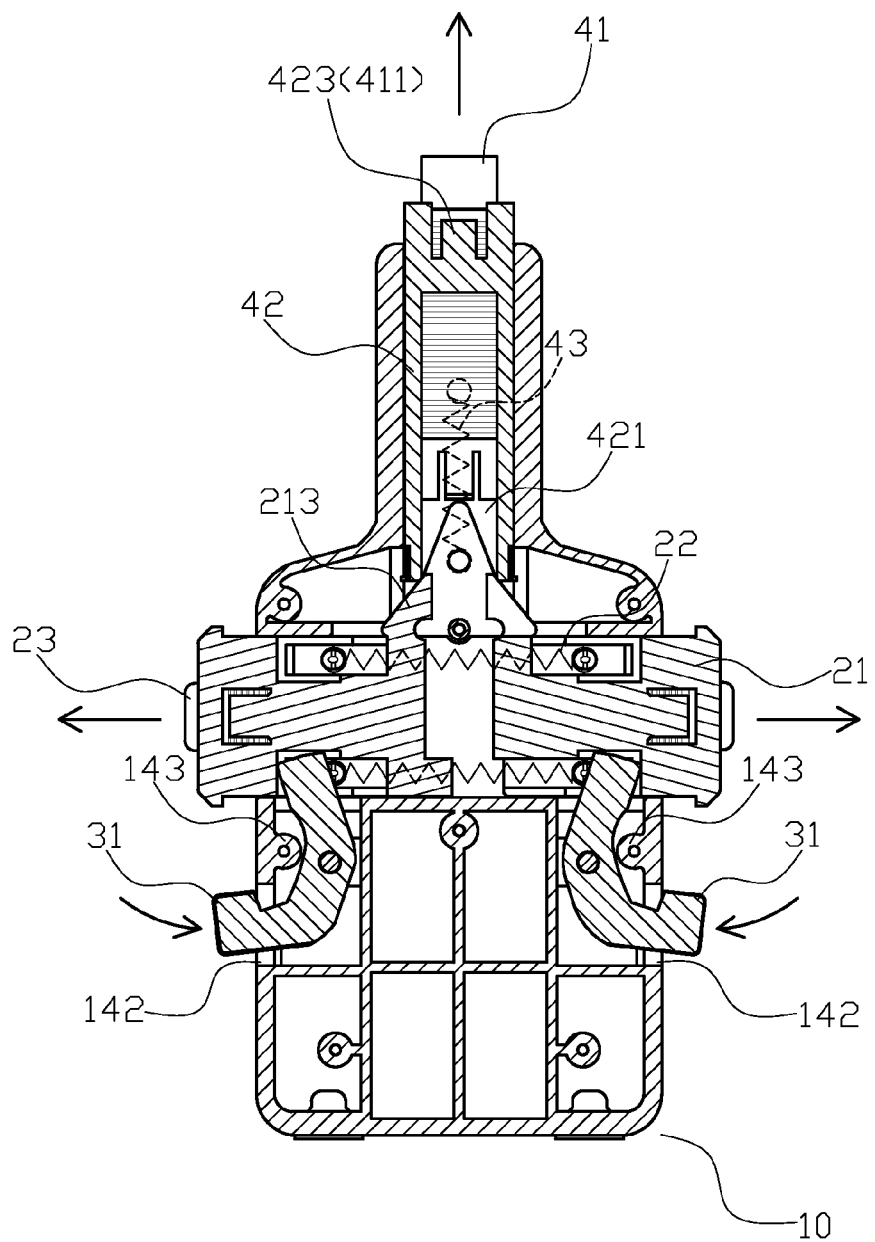
FIG. 14 illustrates the status after two push buttons were pressed

When the time for practical use, depending on the difference based on actual the sizes of electronic gadget, adjust accordingly with the jaws (23) and clamp arm (41) stretching to initial mobilization, also through two of the push buttons (31) pressing at the same time (please also refer to FIG. 13, and FIG. 14 for better understanding).

The brakes rotary controls (30) swing, will driven out the moveable blocks (21) together with the jaws (23) which can be paddles (32). In order to put in the electronic gadget the two frame sheets (213) opposite away from each other, while also pushing the entire nip unit (40) pressing upwards. When the electronic gadget placed inside, release the push button (31), so that the two movable blocks (21), the jaws (23) along with the nip unit (40) can all be reset pressing spring (22) or pulling back the spring (43).

The jaws (23) of the clamping pieces (232) of the electronic gadget on both sides of the clamping towards each other. To incorporate with the gripping arm (41) giving pressure on the electronic gadget, is also holding the positive and negative limits (412) and the support arms (11) are in between, to serve using the backplane (15) slot (151) and connection board (71) on the holder (70) to form complexes. The body (10) along with electronic gadget are put together to form a straight horizontally or mounted on a bicycle handlebar; when user desire to remove the electronic gadget, the movable blocks (21), the jaws (23) and the nip unit (40) move along together, by pressing the second button (31), the whole set will be removed easily.

Figure 15:
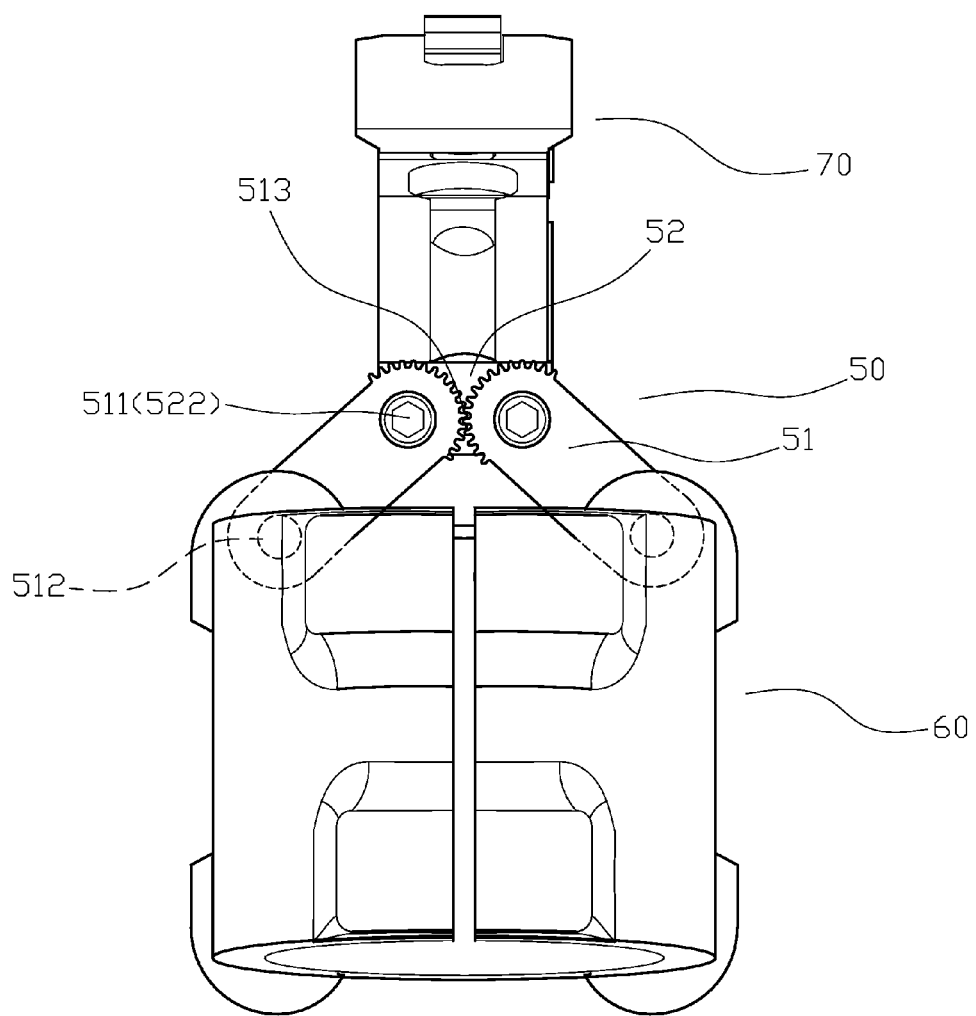
FIG. 15 illustrates a schematic of the standpipe connection seat with different sizes.

Also, with the variety of appearance, size, as the conventional standpipes (60), the beam and screw between the beam of the glove bundle (61) and the front cover body (62) is measured as different distances together with the screw perforation (621) (Please also refer to FIG. 15). Then, by the fine adjustment unit (50) of the two pieces of latches (51), the fine adjustment unit open movement, and in response to a variety of standpipe (60) spiral structure together with the screw perforation (621). Two combination holes to adjust the distance (512) between the fixed holder (70) in the connection holder (52) further setup fine adjustment unit (50) located at the other standpipe (60), thereby allowing the fixed holder (70) can be applied to all kinds of standpipe (60), with a practical, on the other hand also reduce structural costs mounts holder (70) mounted on the standpipe (60) of, both have reached its economic benefits.

The present invention is to provide the structural improvement on bicycle clamping device for electronic gadgets, wherein the container chamber (14) within the system is provided with a convex portion (143) for facilitating the projection portion (143) as a rotation control (30) is pressed spin pendulum fulcrum person.

The present invention is to provide the structural improvement on bicycle clamping device for electronic gadgets, in which there is a long slot on top of the moveable blocks (21) to provide capability of using tabs (233) into the card with the jaws (23) limited through the long slot (216) and shrapnel (233). This will prevent the jaws (23) from adjusting too much expansion, then detachment from moveable blocks (21).

Comparing with prior arts, the present invention is advantageous because (i) the fine adjustment unit (50) is to provide the holder (70) assembled using the system for frame body (1), coupled with the fixed standpipe (60). When holder (70) is used in the installation of other types of bicycles, or the replacement of the riser structure for its bicycle frame, the fine adjustment unit is reusable corresponding to the size of the structure is assembled and adjusted with standpipe holder (70) with fine adjustment unit, it is applicable to various kinds of standpipe (60) adding the holder (70) easily assessable without additional correspondence or other types of bicycle purchase necessary for an additional standpipe fittings, which increase its economic advantages; (ii) the holder is moveable, so the usage to electronic gadgets of that frame body (1) does not limit to a single size. Furthermore, it effectively reduces the cost of the structure when user desire to replace the electronic gadgets of a different size. The frame body (1) can always be used as followed to avoid frequent replacement and be a wasteful user; (iii) its elastic teeth (215) on the rack (231) were retaining, with the spring (22) pulled back. The department can get double the positioning force, so that the clamping device (20) no fears as the shock when riding, it is easy to release, the department can prevent electronic gadget from releasing and falling off the shock riding bicycle to reach the use of safety; and (iv) the present invention is to provide the structural improvement on bicycle clamping device for electronic gadgets, whose moveable blocks (21), jaw (23), and crimping unit (40) to tighten or loosen is installed easier for electronic gadgets, its release and fasten without individual operation, therefore, reached the great convenience to the users.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An electronic device holder on a bicycle comprising a frame body and a standpipe connection seat; the frame body including a body, a clamping device, two rotation controls and the nip unit; the standpipe connection seat including a fine adjustment unit, which is located on a handle portion of the standpipe connection seat to secure the body, wherein the body has two arms and a convex neck, which has a long hole downward; and a positioning column is connected with a spring; a through penetrating channel is formed at a rear end of the body, a container chamber is located laterally on the penetrating channel through a through hole, which has an opening through the body, and the body opens all the way through the back to serve a backplate with cross-shaped slot, wherein the clamping device has two movable blocks inserted from the side of the penetrating channel, and a restoring spring is disposed between two movable blocks, and each movable block has a recessed portion on a rear end thereof between the two movable blocks are fixed; the moveable blocks has placed through two side ends into the channel from clamping device; a track slot is formed on the side of the clamping device, and the track slot is equipped with elastic teeth, and track slot has two hooks to engage with the elastic teeth, wherein a rotary control has a push button, and a wave chip, and the rotary control is pivotally disposed in the container chamber at the middle portion thereof, so that the wave chip is able to pass through the recessed portion of the movable block through the through hole, and the push button is able to extend out from the opening, and when the rotary control is pivotally placed in the container chamber, the rotary control is secured through the combination of backplane and the body to prevent the rotary control from falling out;

wherein the nip unit contains inner and outer gripping arms and a rail, and the rail and the gripping arms are arranged in the long hole inside the body, and a notch is provided at a rear end of the rail for said two movable blocks to escape, so a supporting piece of each movable block is able to be inserted into the rail, and an inclined surface of the supporting piece and the rail are disposed against each other, wherein the notch of the rail extends at the bottom with a spring to connect the positioning column; above the notch is the elastic tooth engaged with the rear portion of the gripping arm, and a clamping piece is extending from an upper portion of the gripping arm; and wherein the fine adjustment unit has two pieces of latches, which have a connecting hole and a combination hole at an opposite end of the rear end thereof, and the outer portion of the connecting holes has an arc ring teeth, and a connecting base is formed through the connecting holes.

2. The electronic device holder on a bicycle of claim 1, wherein the cross-shaped slot on the backplate is configured to connect with the connecting board of the holder, so the body and the electronic device is able to be disposed on the handle of the bicycle in either a horizontal or vertical manner.

3. The electronic device holder on a bicycle of claim 1, wherein outer portion of the movable block is enlarging with a stopping edge.

4. The electronic device holder on a bicycle of claim 1, wherein the container chamber has a protruding unit.

5. The electronic device holder on a bicycle of claim 1, wherein the movable block has an elongated slot to engage with the hook.

6. The electronic device holder on a bicycle of claim 1, wherein a gasket is provided for the two pieces of the latches.

7. The electronic device holder on a bicycle of claim 1, wherein two locking holes are corresponding to two connecting holes and a locking unit.

* * * * *